United States Patent
Pitzer

(10) Patent No.: US 11,618,446 B2
(45) Date of Patent: Apr. 4, 2023

(54) SYSTEMS AND METHODS FOR MEASURING TRAILER WHEEL ROTATIONAL SPEED

(71) Applicant: Waymo LLC, Mountain View, CA (US)

(72) Inventor: Benjamin Pitzer, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 193 days.

(21) Appl. No.: 17/120,199

(22) Filed: Dec. 13, 2020

(65) Prior Publication Data
US 2021/0197815 A1     Jul. 1, 2021

Related U.S. Application Data

(60) Provisional application No. 62/954,080, filed on Dec. 27, 2019.

(51) Int. Cl.
*B60W 30/14* (2006.01)
*G01S 13/58* (2006.01)
(Continued)

(52) U.S. Cl.
CPC ........ *B60W 30/143* (2013.01); *B60W 40/105* (2013.01); *G01S 13/581* (2013.01); *G01S 13/88* (2013.01); *B60W 2420/52* (2013.01); *B60W 2510/20* (2013.01); *B60W 2520/10* (2013.01); *B60W 2520/28* (2013.01)

(58) Field of Classification Search
CPC ........... B60W 40/105; B60W 2520/10; B60W 2520/28; B60W 2510/20; B60W 2420/52; B60W 30/143; G01S 2013/932; G01S 2013/93273; G01S 2013/93274;
(Continued)

(56) References Cited

U.S. PATENT DOCUMENTS 9,315,212 B1 * 4/2016 Kyrtsos .............. B62D 15/0285
9,335,162 B2 * 5/2016 Kyrtsos ............. B60W 50/0097
(Continued)

FOREIGN PATENT DOCUMENTS

CN        113049846 A  *  6/2021   .......... B60W 30/143

*Primary Examiner* — Atul Trivedi
(74) *Attorney, Agent, or Firm* — McDonnell Boehnen Hulbert & Berghoff LLP

(57) ABSTRACT

Example embodiments relate to measuring rotational speeds of trailer wheels using radar. A computing device may cause a vehicle radar unit to transmit radar signals toward a wheel of trailer being pulled by the vehicle. The computing device may receive radar reflections corresponding to radar signals that reflected off the wheel and determine a rotational speed of the wheel based on the radar reflections. For instance, the computing device may identify the highest or lowest frequency in the frequency spectrum of the radar reflections and use the frequency and the wheel's radius to calculate the rotational speed of the wheel. The computing device can use rotational speed measurements for trailer wheels to monitor performance of the trailer and adjust vehicle navigation accordingly. In some instances, the computing device may determine that one of the trailer wheels requires servicing based on monitoring the rotational speeds of the trailer wheels.

20 Claims, 11 Drawing Sheets

(51) Int. Cl.
*G01S 13/88* (2006.01)
*B60W 40/105* (2012.01)

(58) Field of Classification Search
CPC ........ G01S 7/415; G01S 13/581; G01S 13/88; G01S 13/931
USPC .......................................................... 701/93
See application file for complete search history.

(56) References Cited

U.S. PATENT DOCUMENTS

| | | | |
|---|---|---|---|
| 9,335,163 B2* | 5/2016 | Lavoie | B60D 1/245 |
| 9,513,103 B2* | 12/2016 | Crossman | B60W 10/20 |
| 9,733,342 B1* | 8/2017 | Brown | G01S 13/931 |
| 9,821,845 B2* | 11/2017 | Xu | B62D 13/06 |
| 2005/0206225 A1* | 9/2005 | Offerle | B60T 8/246 |
| | | | 303/7 |
| 2005/0209762 A1* | 9/2005 | Lu | B60T 7/22 |
| | | | 701/96 |
| 2008/0046149 A1* | 2/2008 | Breed | B62D 21/15 |
| | | | 701/45 |
| 2009/0093928 A1* | 4/2009 | Getman | G01S 15/931 |
| | | | 701/37 |
| 2010/0194593 A1* | 8/2010 | Mays | B60W 10/184 |
| | | | 340/905 |
| 2014/0172232 A1* | 6/2014 | Rupp | B62D 13/06 |
| | | | 701/36 |
| 2017/0293016 A1* | 10/2017 | McCloskey | G01S 17/08 |
| 2017/0336503 A1* | 11/2017 | Hammerschmidt | H01P 3/12 |
| 2018/0149742 A1* | 5/2018 | Izadian | H01Q 1/428 |
| 2019/0279447 A1* | 9/2019 | Ricci | H04L 67/306 |
| 2019/0326501 A1* | 10/2019 | Gilbert | H02K 55/00 |

* cited by examiner

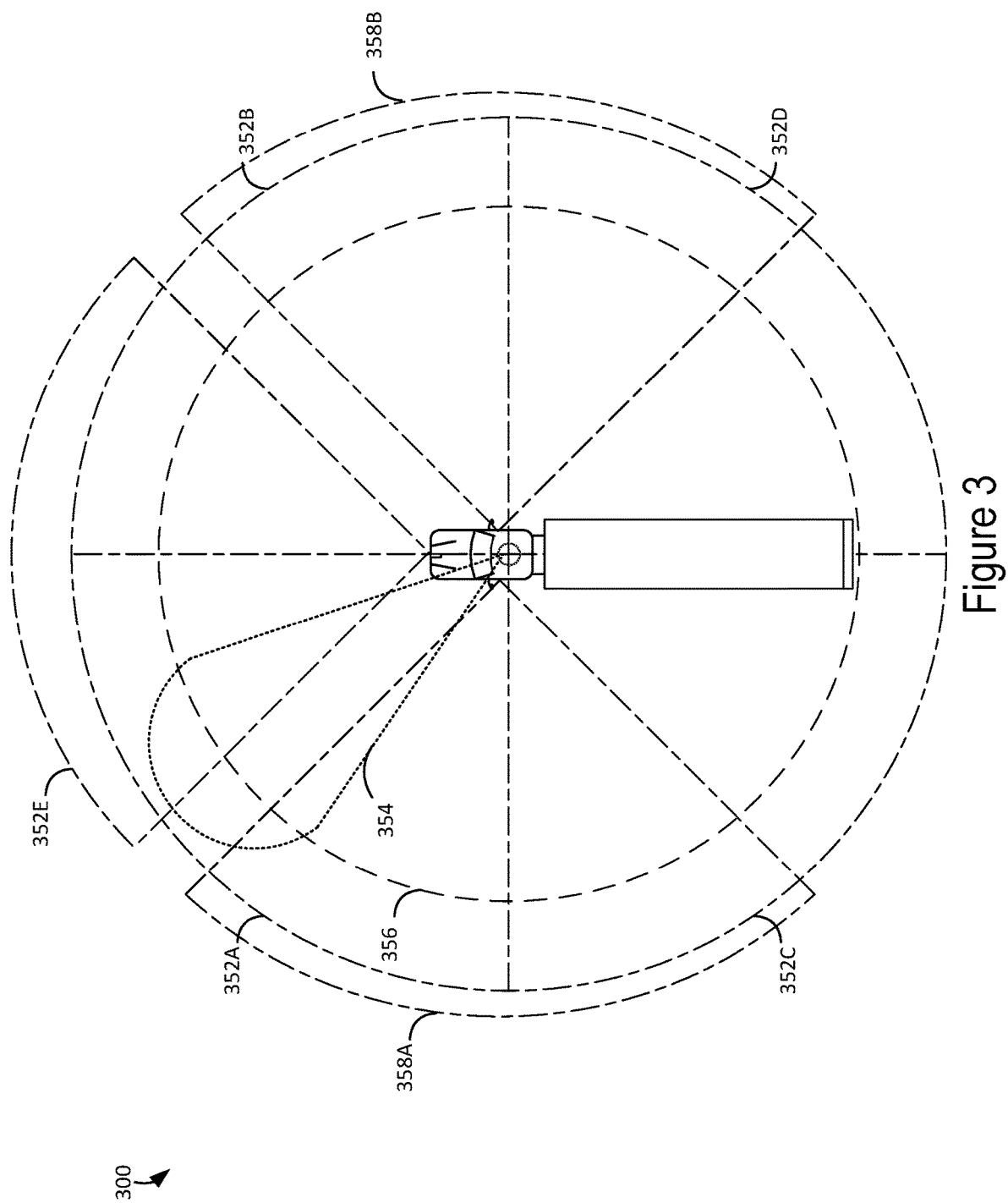

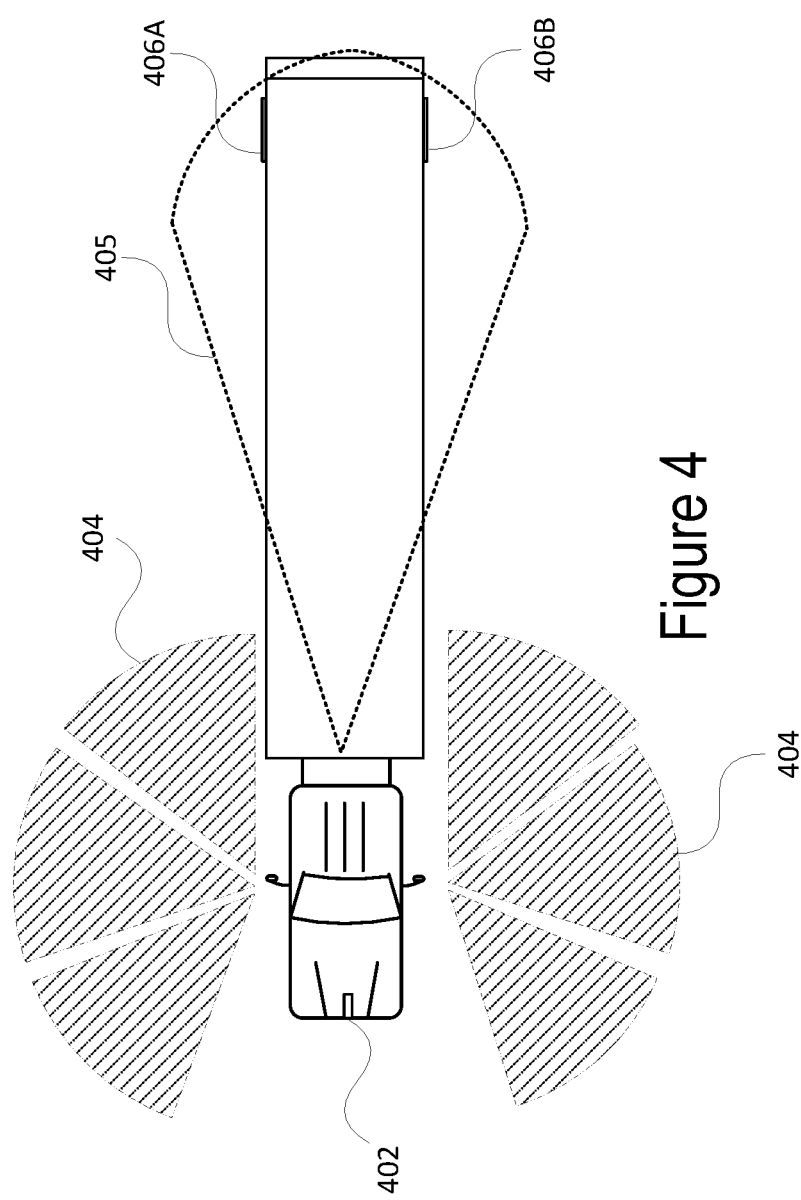

SYSTEMS AND METHODS FOR MEASURING TRAILER WHEEL ROTATIONAL SPEED

CROSS REFERENCE TO RELATED APPLICATION

The present disclosure claims priority to U.S. Provisional Application No. 62/954,080, filed on Dec. 27, 2019, the entire contents of which is herein incorporated by reference.

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments relate to techniques for measuring the rotational speed of trailer wheels using radar or another type of sensor coupled to the vehicle towing the trailer. By determining the rotational speed of trailer wheels, a system can monitor the health and operation of the trailer wheels, which can be leveraged to increase safety during navigation.

Accordingly, a first example embodiment describes a system. The system includes a radar unit coupled to a vehicle. The vehicle is towing a trailer and the radar unit has a field of view that includes a wheel of the trailer. The system also includes a computing device. The computing device is configured to cause the radar unit to transmit radar signals toward the wheel and receive radar reflections corresponding radar signals that reflected off the wheel. The computing device is also configured to determine a rotational speed of the wheel based on the radar reflections.

Another example embodiment describes a method. The method involves causing, by a computing device coupled to a vehicle, a radar unit to transmit radar signals toward a wheel of a trailer. The trailer is coupled to the vehicle and the radar unit has a field of view that includes the wheel. The method further involves receiving radar reflections corresponding to radar signals that reflected off the wheel and, based on the radar reflections, determining a rotational speed of the wheel.

An additional example embodiment describes a non-transitory computer-readable medium configured to store instructions, that when executed by a computing system, causes the computing system to perform operations of the method described above.

A fourth embodiment may involve a system that includes various means for carrying out each of the operations of the first, second, and third embodiments.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments.

BRIEF DESCRIPTION OF THE FIGURES

FIG. 3 illustrates a field of view for various sensors, according to one or more example embodiments.

FIG. 4 illustrates beam steering for a sensor, according to one or more example embodiments.

DETAILED DESCRIPTION

Figure 1:
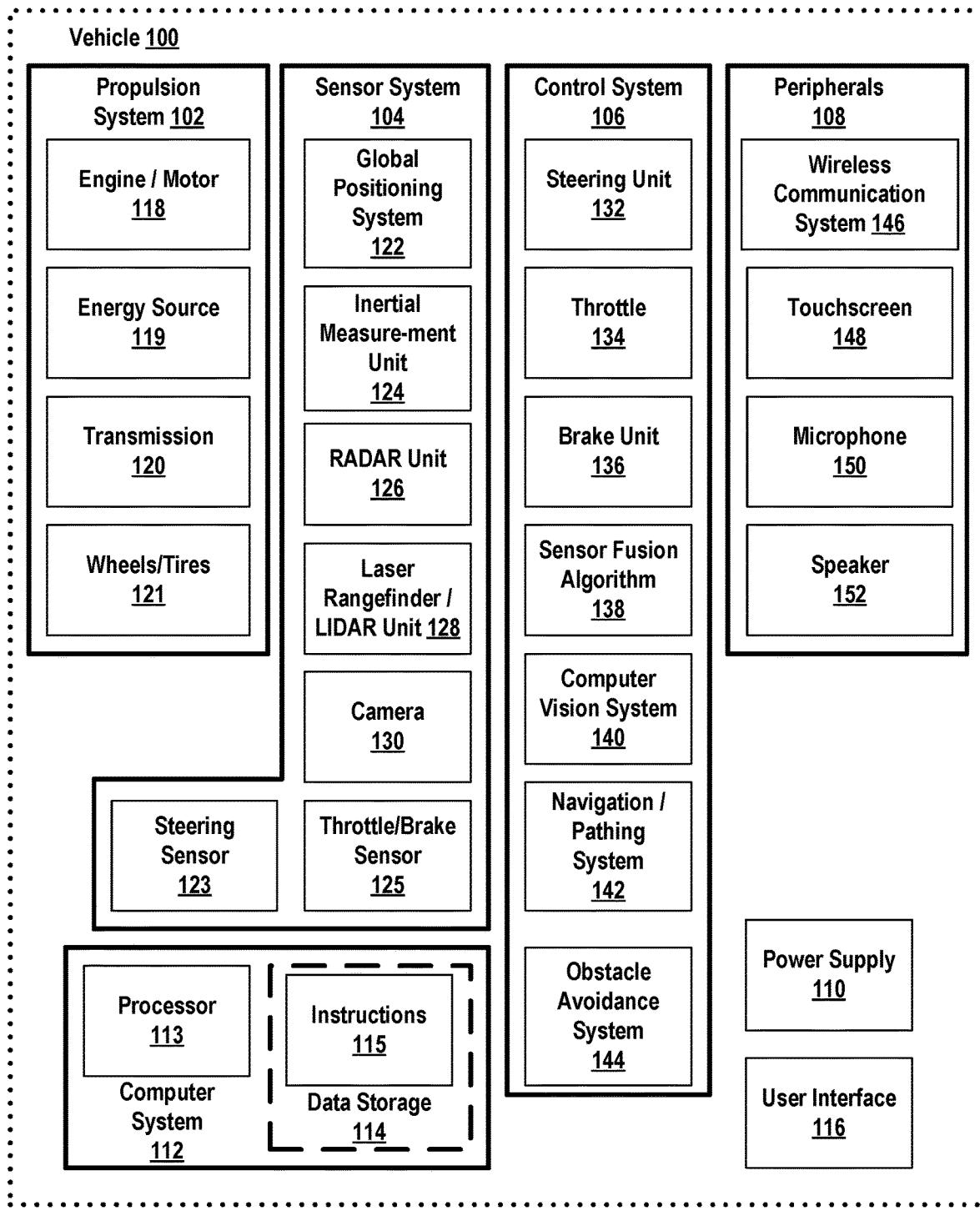
FIG. 1 is a functional block diagram illustrating a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system uses radar units to capture measurements of the surrounding environment. In particular, a radar unit may use transmission antennas to emit (i.e. transmit) radar signals in predetermined directions to measure aspects of that direction of the environment. Upon coming into contact with surfaces in the environment, the transmitted radar signals can scatter in multiple directions with a portion of the radar signals penetrating into surfaces and another portion of the radar signals reflecting off the surfaces back towards reception antennas on the radar unit (or another radar unit)

that can capture the reflections. The received reflected signals are then processed by a radar processing system to determine two dimensional (2D) or three dimensional (3D) measurements of the environment, including positions, orientations, and movements of various nearby surfaces. A radar system may include one or more radar processing systems configured to process incoming radar reflections received at the various radar units.

Because a radar system can measure distances and motions of objects and other surfaces in the environment, radar systems are increasingly used in vehicle navigation and safety systems. For instance, a vehicle radar system can capture measurements around the vehicle that can be used to detect and help identify nearby vehicles, road boundaries, weather conditions (e.g., wet or snowy roadways), traffic signs and signals, and pedestrians, among other features in the surrounding environment. Accordingly, radar measurements are often used by a vehicle navigation system when formulating control strategies for autonomous or semi-autonomous navigation.

In practice, a vehicle radar system for a car or a similar type of vehicle often has radar units coupled at various exterior locations, such as on the side mirrors, bumpers, the roof, front grill, doors, or side panels on the vehicle. These locations are frequently selected for installation of the radar units to enable the collection of radar units to capture measurements of the surrounding environment and the installation of radar units on these exterior portions does not require a redesign and special manufacturing of the vehicle. In addition, radar units coupled at exterior locations can be easily adjusted for calibration purposes.

Although vehicle radar is typically used to measure aspects of the vehicle's surrounding environment, vehicle radar can also be used to enhance vehicle operations in other ways. Example embodiments presented herein involve using vehicle radar to determine the rotational speed of trailer wheels. A semi-truck or another type of vehicle that tows a trailer may use radar or other sensors to determine rotational speeds of the trailer wheels during navigation. By monitoring the rotational speeds of the trailer wheels, vehicle systems can quickly identify when a trailer wheel ceases to operate properly and enable the vehicle to respond accordingly. For example, the vehicle may gradually stop in a safe area in response to detecting that one or more trailer wheels is not rotating at a given rotational speed that matches other trailer wheels. In some cases, monitoring rotational speeds of trailer wheels can help enhance safety during navigation. For instance, the vehicle may adjust turning radius or speed based on the rotational speeds of the trailer wheels. As such, the rotational speed can indicate the current health and operation of tire and help ensure that the trailer is functioning properly during the tow.

Various types of vehicles may use the sensor arrangements and sensor data processing techniques described herein. Example vehicles include, but are not limited to, semi-trucks, trucks, tractors, sports utility vehicles (SUVs), and vans, among others. Example trailers may include, but are not limited to, flatbeds, enclosed trailers, refrigerated trailers lowboys, multi-car trailers, and specialized trailers. In addition, a trailer may also correspond to another type of structure, such as a mobile home or another vehicle in tow.

To illustrate an example, a semi-truck is a type of vehicle designed to tow a trailer. To enhance the operation of the semi-truck, one or more sensor systems may be strategically arranged on the tractor unit to enable the tractor unit to use sensor data regardless of which trailer is connected (if any). As such, a computing device on the semi-truck may cause a radar unit to transmit radar signals toward a trailer wheel and receive radar reflections that correspond to radar signals that reflected off the wheel. The computing device can use frequencies of the radar reflections and the radius (or diameter) of the trailer wheel to calculate the current rotational speed of the trailer wheel. The computing device may monitor trailer wheel rotational speeds to increase safety during navigation and identify potential issues that may arise when one or more trailer wheels ceases to operate properly. The rotational speed for a trailer wheel may be determined as rotations per minute (RPM) or quantified in other ways within examples. In some instances, tires may have steel belts embedded that can boost sensor measurements (e.g., radar reflections).

As indicted above, radar can be used to measure velocities of objects traveling towards and/or away from the sensor. As such, radar units coupled to a vehicle towing a trailer can be directly pointed at a rotating tire on the trailer to observe the upper portion of the tire moving in one direction (e.g., moving toward the sensor) and the lower portion of tire moving in the other direction at the same speed (e.g., move away from the sensor). The observed velocity decreases as measurements are captured closer to the center of the tire. As a result, a radar unit with a large enough view to observe a large enough portion of the tire (e.g., the entire tire) can capture measurements of the largest observed velocity (positive or negative) enabling a processing unit to assume that this portion of the tire likely corresponds to an outer portion (e.g., proximate the circumference) of the wheel to calculate the rotational speed co using the wheel radius r as follows:

$$\omega = \frac{v}{2\pi r} \quad (1)$$

In some embodiments, a system may use one or more sensors to measure the rotation speed by comparing the frequency spectrum returned in measurements of a trailer wheel. For instance, a short radar pulse (e.g., 500 MHz) can be reflected and slightly distorted by the tire. The portion of the tire turning toward the sensor may cause a Doppler shift to higher frequency and the receding portion may cause a corresponding Doppler shift to a lower frequency. The results of these Doppler shifts can produce a frequency spectrum response of the radar pulse. As such, a processing unit can select and use the highest or lowest frequency and the radius of the trailer wheel to calculate the current rotational speed of the trailer wheel using the equation above.

By measuring rotational velocities of multiple wheels, the system may detect and anticipate potential performance issues. For example, the system may compare the velocities of multiple wheels of the trailer and/or vehicle to identify differences may signal the vehicle or trailer is experiencing a potential issue. In some instances, a wheel velocity variance between multiple wheels that exceeds the threshold difference may signal an issue, such as a flat tire, a broken tire spoke, or some other complication.

In some embodiments, a vehicle system may also compare current rotational speed of a trailer wheel to one or more benchmark wheel rotational speeds. A benchmark rotational speed for a trailer wheel, also referred to herein as expected wheel speed, may represent a desired rotational speed for a wheel to be rotating based on current operations of the vehicle (e.g., speed, heading, and slope of travel) and other possible factors (e.g., weight of cargo carried by the trailer).

As discussed above, the benchmark wheel rotational speed may be based on sensor measurements of one or more other wheels associated with the vehicle and/or trailer. For instance, the benchmark wheel velocity for analyzing the wheel velocity of a trailer may be based on wheel velocity measurements obtained from wheels of the trailer (e.g., a wheel on the tractor unit). In some instances, a benchmark wheel velocity may be based on one or more recorded wheel velocity. For instance, the system may use periodic measurements of wheel velocities to ensure that wheels are operating as desired.

To further illustrate, the system may compare current wheel velocity measurements determined using sensor measurements (e.g., radar) with past measurements when the vehicle was navigating in a similar situation. A similar situation may be when the vehicle was traveling a similar speed (e.g., 60 miles per hour) on a similar path (e.g., same slope and heading). The system may factor additional parameters when analyzing wheel velocities of the vehicle and trailer. For instance, the system may obtain measurements from the inertial measurement unit (IMU) of the vehicle and/or other sensors (e.g., angle from a steering sensor) to determine a current speed and orientation of travel of the vehicle.

In some embodiments, the system may factor navigation parameters because navigation of the vehicle can impact expectations for the velocity of the wheels. For example, when the vehicle is navigating a straight path, it might be desirable for the velocity of the wheels of the cab portion and the velocity of the wheels of the trailer portion to be equal. Thus, if the system detects a substantial variance between the vehicle wheel velocity and the trailer wheel velocity, the system may determine that there is some sort of issue (e.g., flat or blown tire, broken tire spoke or axle, sensor error) and perform a corrective action (e.g., execute an emergency stop procedure).

During navigation, the system may monitor the wheel velocities of one or more wheels during various types of vehicle movement, including during turns or applications of the brakes. By monitoring measured wheel velocities, the system may be able to determine if the brakes are functioning correctly, for example, brakes are locking up or not engaging properly. If the brakes are not functioning correctly, the control system may be able to modulation the application of the brakes to prevent lockup. In other examples, if the brakes are not engaging correctly, the vehicle may enable a backup braking system or performance another strategy (e.g., an emergency stopping procedure).

In another example, the system may be able to monitor a reduction of control of the trailer, such as a skid, based on the measured wheel velocity. The control system may be able to adjust a control scheme or maneuver for the vehicle in response to the loss of control. The system may also monitor trailer wheel velocities during turns or other challenging navigation moves. In some examples, the system may monitor the wheel speed of the trailer continuously. In other examples, the system may use map data and/or other sensor information to determine when to check wheel speed of one or more wheels of the trailer.

Some trailers may have the ability to adjust the position of the wheels on the trailer based on the overall load weight and/or weight distribution on the trailer. As such, the wheel rotational speeds measured for trailer wheels can be used to adjust the position of the wheels on the trailer to positions that can increase navigation abilities and efficiency.

In some embodiments, the radar system may be able to determine radar reflections that are associated with one or more wheels of the trailer. The radar system may use range, angle, and Doppler measurements to identify the radar reflections associated with different wheels. The radar system may then be able to filter the wheel reflections from the radar reflection signals to reduce noise in the received radar signals.

Some example radar systems may be configured to operate at an electromagnetic wave frequency in the W-Band, for example the frequency may be between 75 and 82 Gigahertz (GHz), which corresponds to electromagnetic waves on the order of millimeters (e.g., 1 mm, 4 mm). The radar systems may use antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Referring now to the figures, FIG. 1 is a functional block diagram illustrating example vehicle 100, which may be configured to operate fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. In other examples, vehicle 100 may include more or fewer subsystems. The subsystems and components of vehicle 100 may be interconnected in various ways (e.g., wired or wireless connections). In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Sterling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar unit 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects, including the speed and heading of the objects, within the local environment of vehicle 100. As such, radar unit 126 may include antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communications, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2A:
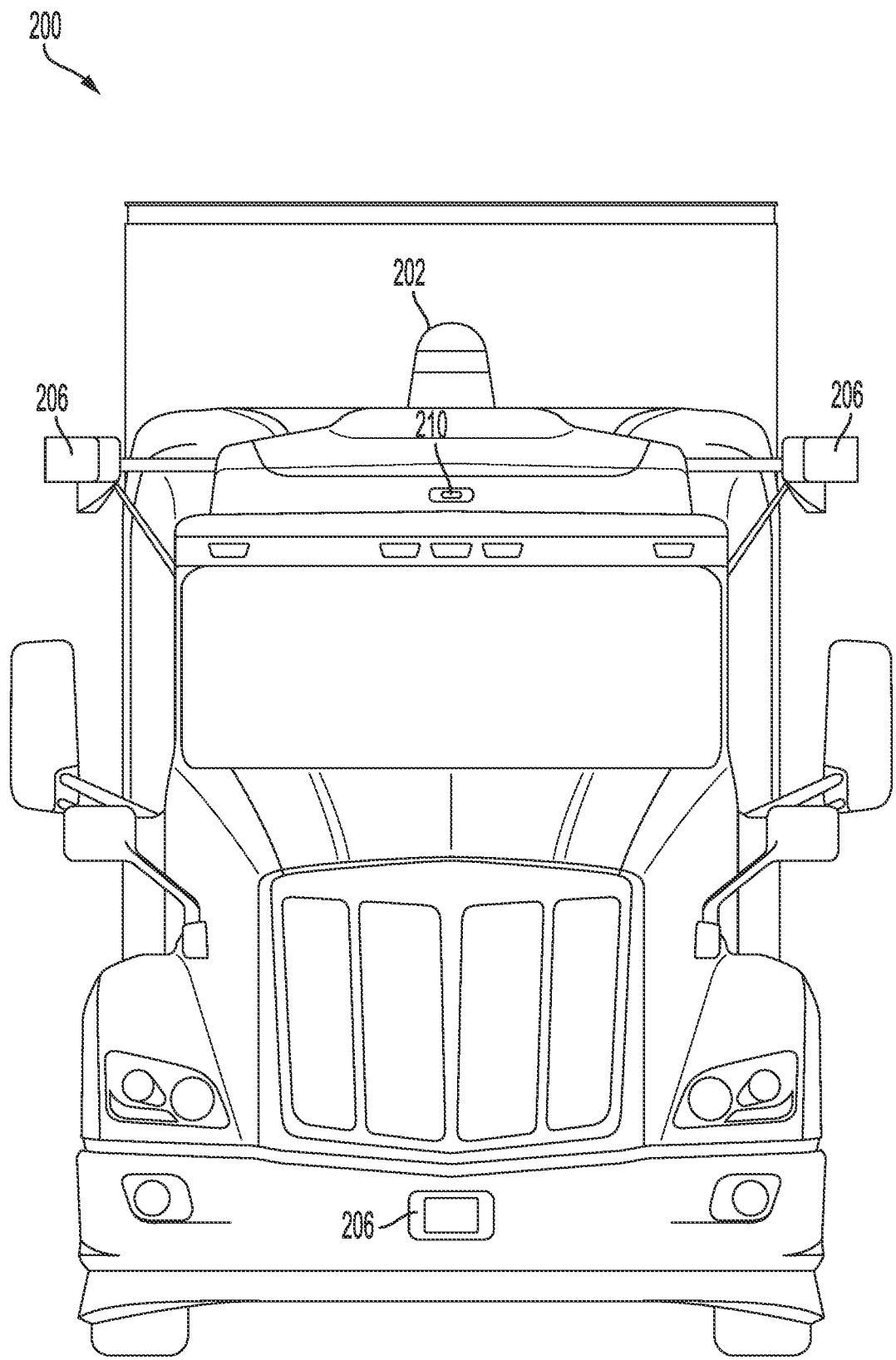
FIG. 2A illustrates a front view of a vehicle, according to one or more example embodiments.
Figure 2B:
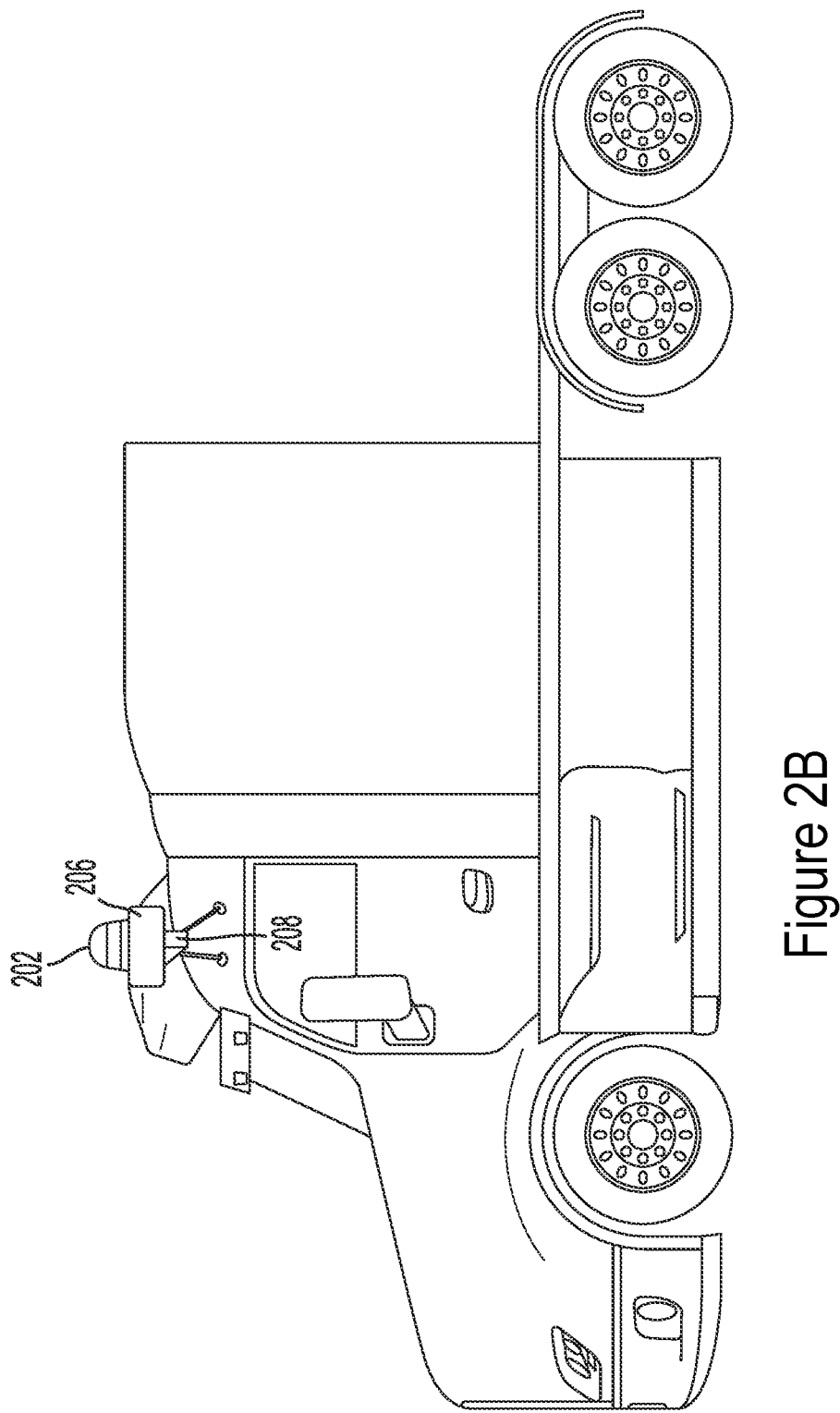
FIG. 2B illustrates a side view of a vehicle, according to one or more example embodiments.
Figure 2C:
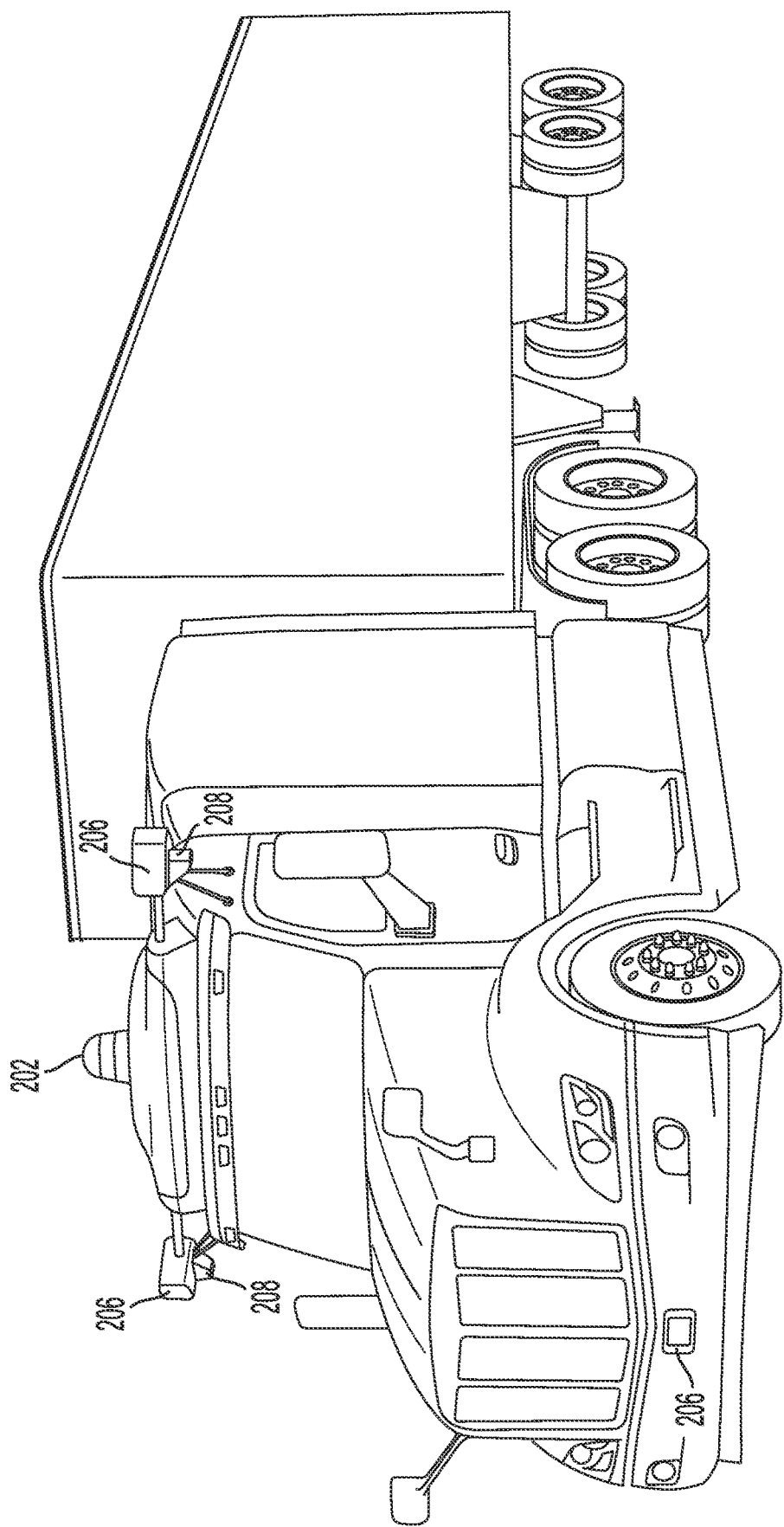
FIG. 2C illustrates a perspective view of a vehicle, according to one or more example embodiments.
Figure 2D:
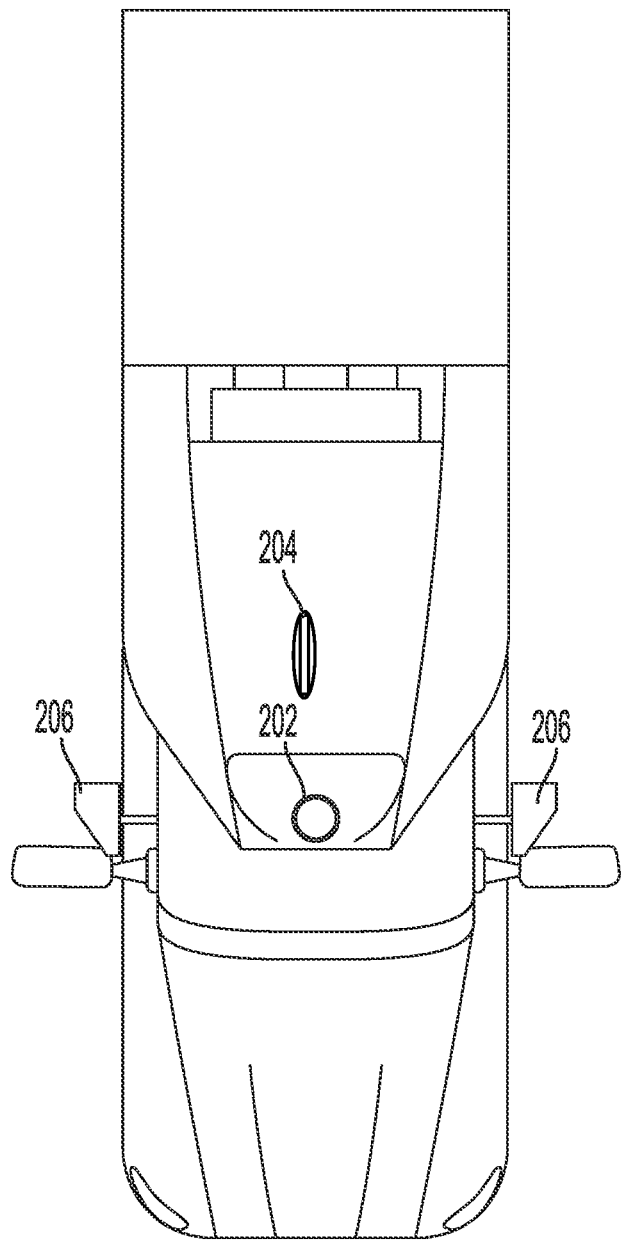
FIG. 2D illustrates a top view of a vehicle, according to one or more example embodiments.

FIG. 2A illustrates a front view of a vehicle 200, FIG. 2B illustrates a side view of a vehicle 200, FIG. 2C illustrates a perspective view of a vehicle 200, and FIG. 2D illustrates a top view of a physical configuration of a vehicle, according to example embodiments. As such, FIGS. 2A-2D together illustrate an example physical configuration of vehicle 200, which may represent one possible physical configuration of vehicle 100 described in reference to FIG. 1. Depending on the embodiment, vehicle 200 may include sensor unit 202, wireless communication system 204, radar unit 206, LIDAR units 208, and camera 210, among other possible components. For instance, vehicle 200 may include some or all of the elements of components described in FIG. 1. Although vehicle 200 is depicted in FIG. 2 as a semi-truck, vehicle 200 can have other configurations within examples, such as a car, a van, a motorcycle, a bus, a shuttle, a golf cart, an off-road vehicle, robotic device, a farm vehicle, or other vehicles pulling a trailer among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around vehicle 200. The movable mount of sensor unit 202 may also be movable in a scanning fashion within a particular range of angles and/or azimuths.

In some implementations, sensor unit 202 may include mechanical structures that enable sensor unit 202 to be mounted atop the roof of a truck. Additionally, other mounting locations are possible within examples.

Wireless communication system 204 may have a location relative to vehicle 200 as depicted in FIG. 2D, but can also have different locations. Wireless communication system 204 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems. Communication system 204 may include a cellular or wireless data connection. The communication system 204 may be configured to communicate with a remote computing system. The remote computing system may be configured to provide instructions and/or data to the vehicle 200 to aid in its autonomous operation.

The vehicle 200 may include several radar units 206 at various locations. In one example, the vehicle 200 may include a radar unit located on each of the front and back bumpers of the cab portion. Additionally, the vehicle 200 may include two radar units located on each side of the vehicle 200 near the side-view mirrors. The two radar units on the sides of the vehicle may be positioned so that one images a forward right section, one images a forward left section, one images a rear right section, and one images a rear left section. Each radar unit may be configured to transmit and receive radar signals over an angular region defined by a beamwidth of the radar unit. In some examples, each radar unit may be able to perform beam steering on either a transmit or receive beam. By using beam steering, a radar unit may be able to interrogate a predefined angular direction.

The vehicle 200 may also include LIDAR units 208 mounted in various locations. For example, LIDAR units 208 may also mounted on the sides of the vehicle 200 near the rear-view mirrors. The LIDAR units 208 may be configured to transmit and receive light signals from the region around the vehicle. The LIDAR units 208 may be able to image the region around the vehicle 200 from which light reflections are received.

Camera 210 may have various positions relative to the vehicle 200, such as a location above a front windshield of vehicle 200. As such, camera 210 may capture images of the environment. For instance, camera 210 may capture images from a forward-looking view with respect to vehicle 200, but other mounting locations (including movable mounts) and viewing angles of camera 210 are possible within implementations. In some examples, camera 210 may correspond to one or more visible light cameras, but can also be other types of cameras (e.g., infrared sensor). Camera 210 may also include optics that may provide an adjustable field of view.

FIG. 3 illustrates an example autonomous vehicle 300 having various sensor fields of view. As previously discussed with respect to FIGS. 2A-2D, vehicle 300 may contain a plurality of sensors. The locations of the various sensors may correspond to the locations of the sensors disclosed in FIGS. 2A-2D. However, in some instances, the sensors may have other locations. Sensors locations are omitted from FIG. 3 for simplicity of the drawing. For each sensor unit of vehicle 300, FIG. 3 shows a representative field of view. The field of view of a sensor may include an angular region over which the sensor may detect objects.

In some embodiments, vehicle 300 may include five radar units. A first radar unit may be located having a field of view of the front-left of the vehicle and have an angular field of view corresponding to the angular portion of field of view 352A. A second radar unit may be located having a field of view of the front-right of the vehicle and have an angular field of view corresponding to the angular portion of field of view 352B. A third radar unit may be located having a field of view on the rear-left of the vehicle and have an angular field of view corresponding to the angular portion of field of view 352C. A fourth radar unit may be located having a field of view on the rear-right of the vehicle and have an angular field of view corresponding to the angular portion of field of view 352D. A fifth radar unit may be located on the front of the vehicle and have an angular field of view corresponding to the angular portion of field of view 352E. Each of the five radar units may be configured with a scannable beamwidth of 90 degrees. A radar beamwidth may be smaller than 90 degrees, but each radar unit may be able to steer the radar beam across the 90-degree field of view.

A first LIDAR unit of the vehicle 300 may be configured to scan the full 360-degree region around the vehicle as shown by an angular field of view corresponding to the angular portion of field of view 356. A second LIDAR unit of the vehicle 300 may be configured to scan a region smaller than the 360-degree region around the vehicle. In one example, the second LIDAR unit may have a field of view smaller than 10 degrees in the horizontal plant as shown by an angular field of view corresponding to the angular portion of field of view 354. The vehicle 300 may also contain two side-view LIDAR, having respective fields of view 358A and 358B. Although the side-view LIDAR are shown having 90-degree fields of view, in some examples, each side-view LIDAR may have a 180-degree field of view.

Additionally, the vehicle may also include at least one camera. The camera may be an optical camera and/or an infrared camera. A field of view of the camera is omitted from FIG. 3.

FIG. 4 illustrates beam steering for a sensor of vehicle 402, according to example embodiments. In some examples, the sensor of vehicle 402 may be a radar sensor. In some other examples, the sensor may be a LIDAR sensor. In some examples, during the operation of the sensor, the sensor may be scanned within the field of view of the sensor. Various different scanning angles for an example sensor are shown as regions 404, which each indicate the angular region over which the sensor is operating. The sensor may periodically or iteratively change the region over which it is operating. In some embodiments, multiple sensors may be used by vehicle 402 to measure regions 404. In addition, other regions may be included in other examples. For instance, one or more sensors may measure aspects of the trailer of vehicle 402 and/or a region directly in front of vehicle 402.

At some angles, region of operation 405 of the sensor may include rear wheels 406A, 406B of trailer 403. Thus, the sensor may measure rear wheel 406A and/or rear wheel 406B during operation. For example, rear wheels 406A, 406B may reflect LIDAR signals or a radar signals transmitted by the sensor. The sensor may receive the reflected signals from rear wheels 406A, 406B. Therefore, the data collected by the sensor may include data from the reflections off the wheel.

In some instances, such as when the sensor is a radar sensor, the reflections from rear wheels 406A, 406B may appear as a noise in the received radar signals. Consequently, the radar system may operate with a reduced signal to noise ratio in instances where rear wheel 406 reflects radar signals back to the sensor.

Figure 5:
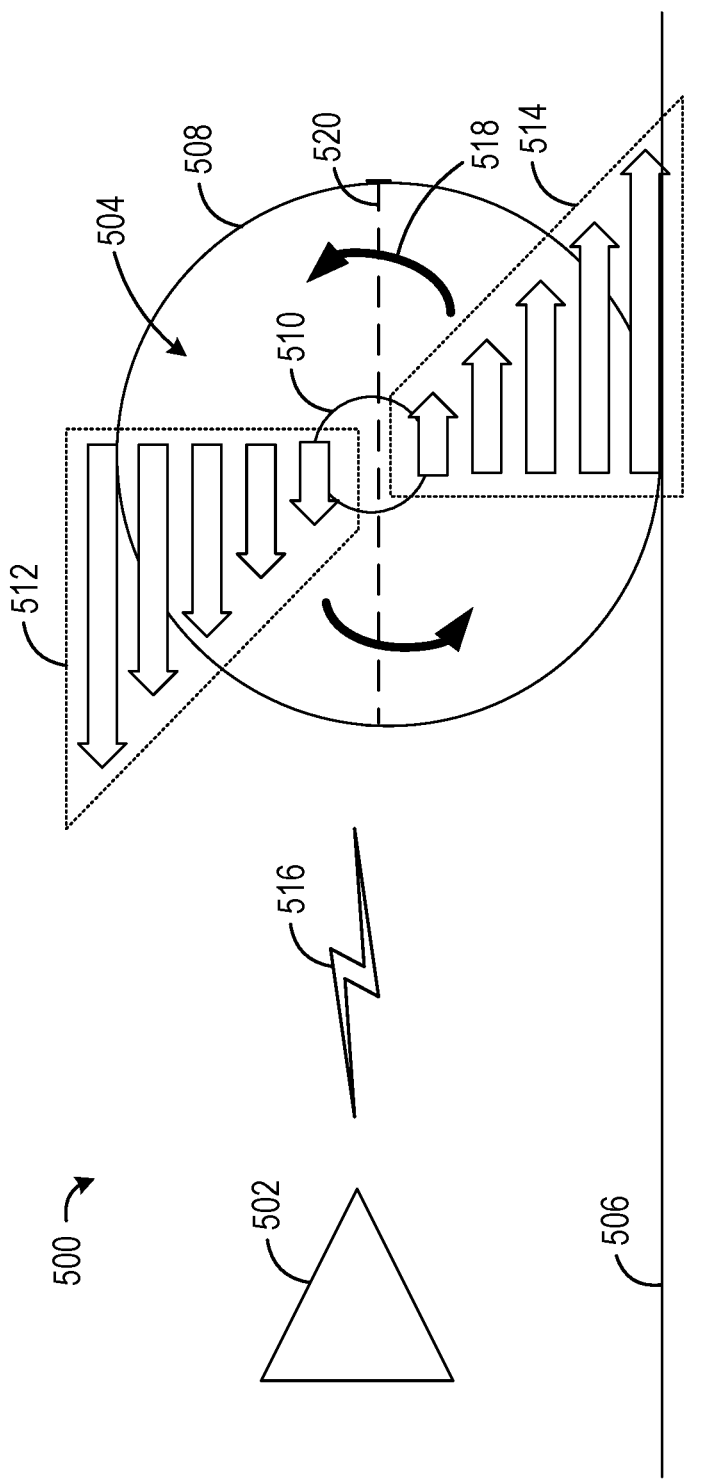
FIG. 5 illustrates a sensor measuring a wheel rotational speed, according to one or more example embodiments.

FIG. 5 illustrates a sensor measuring a wheel speed. In the example embodiment, system 500 shows sensor 502 capturing measurements of wheel 504 traveling on road 506. The embodiment is included for illustration purposes and does not show other potential elements of system 500, such as other portions of the vehicle pulling the trailer or portions of the trailer other than wheel 504. As such, system 500 may include more or fewer components in other embodiments.

Sensor 502 represents any type of sensor that may be positioned on a vehicle and have a field of view that includes wheel 504. For instance, sensor 502 can be a camera, a radar unit, LIDAR, or another type of sensor. For illustration purposes, sensor 502 is described as a radar unit in the embodiment shown in FIG. 5 that can transmit signals 516 that bounce off wheel 504 and reflect back toward and received by sensor 502.

Wheel 504 may represent a trailer wheel located on the front or back axle of a trailer coupled to a vehicle that includes sensor 502. For example, wheel 504 may be a back wheel of a trailer that is being pulled by a semi-truck similar to the example embodiment shown in FIG. 4. As such, sensor 502 may capture measurements using radar signals that reflect off wheel 504 and use the measurements to estimate the current rotation speed of wheel 504. A processing unit may be provided with diameter 520 of wheel 504 for use when estimating wheel rotation velocity. For example, diameter 520 of wheel 504 may be obtained from user input or via communication with a database that indicates wheel diameters for various types of vehicle wheels. In some embodiments, sensor 502 or another vehicle sensor may be used to estimate diameter 520 of wheel 504.

Sensor 502 may transmit signals 516 toward different portions of wheel 504 as wheel 504 rotates toward sensor 502. Signals 516 can bounce off different portions of wheel 504, which are rotating at different speeds. In particular, some signals may reflect off outer portions 508 of wheel 504 while other signals may reflect off inner portions 510 of wheel 504. Rotation speed of wheel 504 increases as the measurement point extends farther from the center of wheel 504. At the center, the rotation is near zero and incrementally increases as measurements are captured further from the center. The increasing size of the arrows within speed measurements 512, 514 is used to represent the increasing wheel speeds detected by sensor 502.

As further shown in FIG. 5, sensor 502 can capture speed measurements 512 of the upper region of wheel 504, which are directed toward sensor 502 because wheel 504 is rotating in that direction during forward travel of the vehicle. As such, speed measurements 512 shows greater speeds are measured from outer portion 508 of wheel 504 relative to the speeds captured from inner portion 510 of wheel 504. Speed measurements 514 are similarly captured by sensor 502 measuring the lower region of wheel 504. Speed measurements 514 are shown extending away from sensor 502 due to forward travel of the vehicle causing forward rotation of wheel 504. System 500 may perform similar techniques while the vehicle is backing up. In such an example, speed measurements 512, 514 would have opposite directions than the directions shown in FIG. 5.

System 500 can use speed measurements 512, 514 to determine the rotational speed of wheel 504. Particularly, using the different returns measured from wheel 504, a computing device can determine the rotation speed of wheel 504 based on diameter 520 of wheel 504 using the following equation:

$$\omega = \frac{\text{velocity}}{\pi \times \text{diameter}} \quad (2)$$

In particular, system 500 may use the largest observed velocity (positive or negative) from speed measurements 512, 514. In some instances, the largest observed velocity corresponds to measurements captured from the outer portion 508, which can be used to estimate the current rotational speed co of wheel 504.

In some embodiments, system 500 may use one or more sensors to measure the rotational speed co of wheel 504 by comparing the frequency spectrum returned in speed measurements 512, 514. For instance, a short radar pulse (e.g., 500 MHz) can be reflected and slightly distorted by wheel 504. The portion of wheel 504 turning toward sensor 502 may cause a Doppler shift to higher frequency and the receding portion may cause a corresponding Doppler shift to a lower frequency. The results of these Doppler shifts can produce a spectrum response of the radar pulse transmitted and received by sensor 502. As such, system 500 can use the highest or lowest frequency to determine the rotational speed co of wheel 504.

System 500 may further involve using the rotational speed co of wheel 504 to perform various checks of the trailer. For example, system 500 may monitor the rotational speed co of wheel 504 during navigation (e.g., during turns), compare the rotational speed co of wheel 504 to the rotational speed of other wheels on the trailer, to monitor the health of wheel 504 and corresponding components (e.g., axle) and/or perform other operations.

Figure 6:
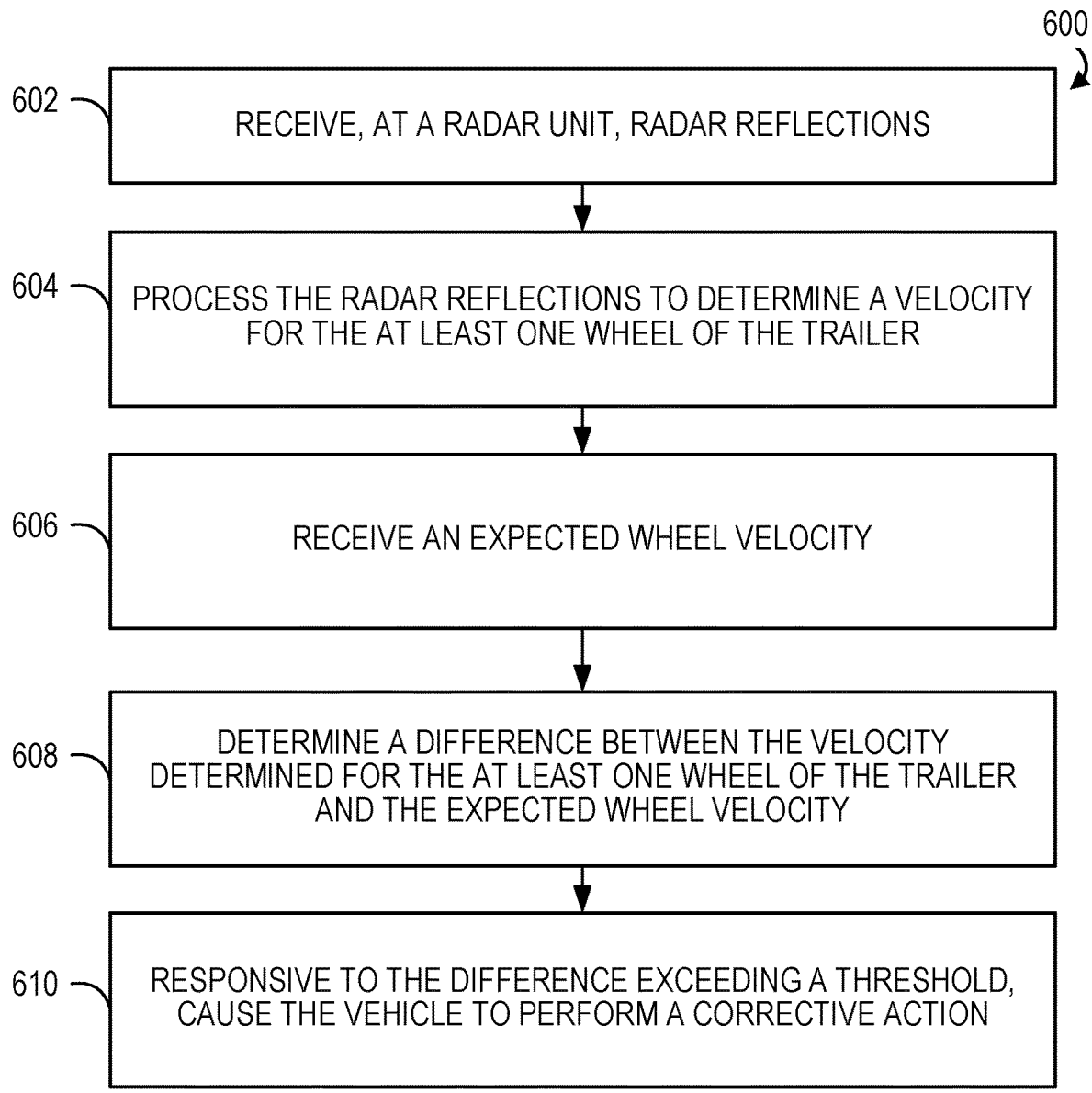
FIG. 6 is a flowchart of method for measuring wheel rotational speed, according to one or more examples.

FIG. 6 is a flowchart of example method 600, which may include one or more operations, functions, or actions, as depicted by one or more of blocks 602, 604, 606, 608, and 610, each of which may be carried out by any of the systems shown in the other figures, among other possible systems.

Those skilled in the art will understand that the flow charts described herein illustrate functionality and operation of certain implementations of the present disclosure. In this regard, each block of the flowcharts may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. Additionally, in some examples, one or more blocks may be performed multiple times simultaneously. For example, block 602 may be performed multiple times simultaneously for each (or a subset of) the radar units on a vehicle. In examples, a computing system may cause a vehicle and radar system to perform one or more blocks of method 600.

Further, method 600 is described with respect to a vehicle radar system. In other examples, however, different types of sensors may be used. For instance, method 600 may be performed using cameras, wheel velocity sensors, and/or LIDAR.

Block 602 involves receiving, at a radar unit, radar reflections. In particular, the radar unit may be coupled to a vehicle (e.g., a tractor unit of a semi-truck) such that the radar unit has a field of view that includes at least one wheel of a trailer coupled to the vehicle. The vehicle may include multiple radar units coupled in a similar manner to measure operations of multiple wheels of the vehicle. In some arrangements, multiple sensors may obtain measurements from the same trailer wheel. The multiple sensors may include the same type (e.g., to or more radar units) or different types of sensors (e.g., a camera and a radar unit). In some examples, multiple radar units may obtain and provide radar reflections corresponding to one or more wheels simultaneously.

The radar unit may be configured to transmit radar into in the surrounding environment of the vehicle. For instance, the radar unit may be used to obtain measurements of one or more wheels of the trailer as well as measurements of the nearby environment. In some instances, the received radar signals may have a Doppler shift based on the rotational velocity of a wheel.

Block 604 involves processing received radar reflection signals by a radar processing system to determine a velocity for the at least one wheel of the trailer coupled to the vehicle. The radar processing system may be able to use both range and Doppler information within received radar reflections to determine which measurements correspond to a wheel of the trailer. In addition or alternatively, the radar system may use angular information to determine which reflections were caused by the trailer's wheel. In some cases, radar reflections caused by a trailer wheel may appear as noise within received radar signals before the processing system associates the radar measurements with the wheel.

In some examples, the radar processing system may receive the radar reflections from the radar unit and remove noise within the radar reflections prior to determining the velocity for one or more wheels of the trailer. As such, the radar processing system may then determine the velocity for the at least one wheel of the trailer responsive to removing noise within the radar reflections.

Block 606 involves receiving an expected wheel velocity. The expected wheel velocity measurement may be received by a control system or another computing system of the vehicle. Additionally, the expected wheel velocity may be based on a wheel velocity of a wheel of the cab portion of the vehicle.

In some examples, receiving the expected wheel velocity measurement includes receiving an actual wheel velocity of a wheel of a cab portion of the vehicle and determining the expected wheel velocity of a wheel of the wheel of the trailer portion of the vehicle. In some examples, the expected wheel velocity of the wheel of the trailer portion may be equal to the wheel velocity of the cab portion. In some examples, such as when the vehicle is turning, the expected wheel velocity of the wheel of the trailer portion may be different than the wheel velocity of the cab portion. As such, a computing system may train a neural network to learn differences in expected wheel velocities based on various parameters of the vehicle, such as a weight of the trailer, a slope of travel, and/or a speed and heading of the vehicle, etc.

In an embodiment, the vehicle may include one or more wheel velocity sensors. For instance, a wheel velocity sensor may be connected to the cab of the vehicle. As such, the wheel velocity sensors may be designed to obtain wheel velocity data from one or more wheels of the vehicle. As such, a computing system may use the wheel velocity data to determine an expected velocity for the trailer.

In some examples, the wheel velocity measurement may be received from a sensor, such as a sensor configured to measure a velocity of one or more wheels of the vehicle. The sensor may be configured to measure the rotational velocity of the wheel (or axle) and determine a velocity for the vehicle (e.g., wheel velocity) based on the rotational velocity. In other examples, the wheel velocity measurement may be calculated based on knowing a velocity of the cab portion (such as through GPS) and determining the wheel velocity based on the known velocity.

Block 608 involves determining, by a processor, a difference between the velocity determined for the at least one wheel of the trailer and the expected wheel velocity. The difference may be determined based on subtracting the tire velocity from the expected wheel velocity or from subtracting the expected wheel velocity from the tire velocity. Thus, the processor may determine the difference between the tire velocity that is measured and the expected value of the tire velocity. In some examples, the difference may be compared to one or more tolerances (e.g., thresholds) during the comparison.

Block 610 involves responsive to the difference exceeding a threshold, causing the vehicle to perform a corrective action. Causing the vehicle to perform the corrective action may involve causing the vehicle to execute an emergency braking action or procedure. For instance, the emergency braking procedure comprises navigating the vehicle safely to a side of a path of travel and slowly decelerating a speed of the vehicle until safely stopping. This way, the vehicle may minimize potential issues that can arise when one or more trailer wheels are not operating in concert with the vehicle wheels due to various potential issues, such as flat tires or misalignment. The emergency braking procedure may involve using a set of brakes of the vehicle (e.g., the cab brakes) with or without brakes associated with the trailer.

In other instances, the processor may cause the vehicle to perform a stability control action. The stability control action may involve slowing down and straightening out a path of the vehicle gradually based on detection of a difference exceeding a threshold. The stability control action may involve using one or more sensors to monitor the roadway and surrounding environment to ensure safe and stable correction of the vehicle.

In some examples, the threshold may be a static threshold. A static threshold may be a single value, such as 5 mile per hour, or a percentage, such as 97% similarity. Thus, if the difference exceeds the single value, the corrective action may be taken. Similarly, if the difference, as a percentage of the velocity, is below the percentage, the threshold may be exceeded. In other examples, the threshold may change dynamically. For example, the threshold may dynamically change based on a movement of the vehicle, such as turning, etc. In another example, the threshold may change based on the velocity of the vehicle. In yet another example, the threshold may change based on a safety criteria. The safety criteria may be based on operating conditions (such as traffic or weather), a payload of the truck (what the truck is carrying in the trailer), road dynamics (such as highway driving or construction), or other criteria as well.

In another embodiment, the processor may determine that the vehicle is performing a turning movement and adjust the threshold based on a degree of the turning movement (i.e., the turning degree). Particularly, the wheel speed of the trailer and the vehicle may vary during the performance of a turn relative to the difference during straight navigation.

Exceeding the threshold may be indicative of some type of error in the system(s) of the vehicle. For example, if the vehicle is driving in a straight line, the velocity of the wheels of the cab portion and the velocity of the wheels of the trailer portion should be equal. If not, the system may determine that there is an error. The error may be determined to be a measurement error of a speed of the cab wheels or a rotational error of the wheels of the trailer, such as an axle that is stuck or a blown tire. Responsive to determining the error, the vehicle may perform a corrective action. Corrective actions may include ignoring an incorrect velocity measurement for a cab wheel, determining that a trailer is unsafe to operate and stopping driving, or other possible actions.

In another example, the system may be able to monitor the wheel velocity during a vehicle movement, such as turning or braking. The system may be able to determine if the brakes are functioning correctly, for example, brakes are locking up or not engaging properly. If the brakes are not functioning correctly, the control system may be able to modulation the application of the brakes to prevent lockup. In other examples, if the brakes are not engaging correctly, the vehicle may enable a backup braking system or method.

In yet another example, the system may be able to monitor a reduction of control of the trailer, such as a skid, based on the measured wheel velocity. The control system may be able to adjust a control scheme or maneuver for the vehicle in response to the loss of control.

Yet further, the radar system may be able to determine radar reflections that are associated with the tire(s) of the trailer. The radar system may use range, angle, and Doppler measurements to determine which radar reflections are from the tire(s). The radar system may then be able to filter the tire reflections from the radar reflection signals to reduce noise in the received radar signals.

In some examples, method 600 may further involve determining, using a sensor coupled to the vehicle, a wheel velocity for a wheel coupled to the vehicle. As such, the processor may then determine the expected wheel velocity for the wheel coupled to the trailer based on the wheel velocity for the wheel coupled to the vehicle.

In an additional example, method 600 may involve receiving, at a second radar unit, second radar reflections. In particular, the second radar unit may be coupled to the vehicle such that the second radar unit has a field of view that includes a second wheel of the trailer coupled to the vehicle. The second wheel of the trailer may differ from the at least one wheel of the trailer measured by the other radar unit described above. Thus, the vehicle may have a set up with redundant radar units coupled to measure multiple wheels of a trailer. As such, method 600 may also involve processing, by the radar processing system, the second radar reflections to determine a velocity for the second wheel of the trailer and performing a comparison between the velocity determined for the at least one wheel of the trailer and the velocity determined for the second wheel of the trailer. Based on the comparison, the processor may control the vehicle.

In another embodiment, method 600 may involve determining that a difference between the velocity determined for the at least one wheel of the trailer and the velocity determined for the second wheel of the trailer exceeds a threshold difference. Based on the determination, the processor may cause the vehicle to execute an emergency braking procedure. As indicated above, an emergency braking procedure can involve navigating the vehicle safely to a side of a path of travel and slowly decelerating a speed of the vehicle. In some instances, the processor may also provide an external signal that conveys the performance of the emergency braking procedure to an external source (e.g., another vehicle or a central computing network monitoring multiple vehicles). The process may also determine that a difference between the velocity determined for the at least one wheel of the trailer and the velocity determined for the second wheel of the trailer is below a threshold difference. In such a determination, the processor may control the vehicle according to a current navigation strategy.

In some examples, the computing system may determine that the anti-lock braking system's system. In response, the computing system may perform a corrective braking action.

Figure 7:
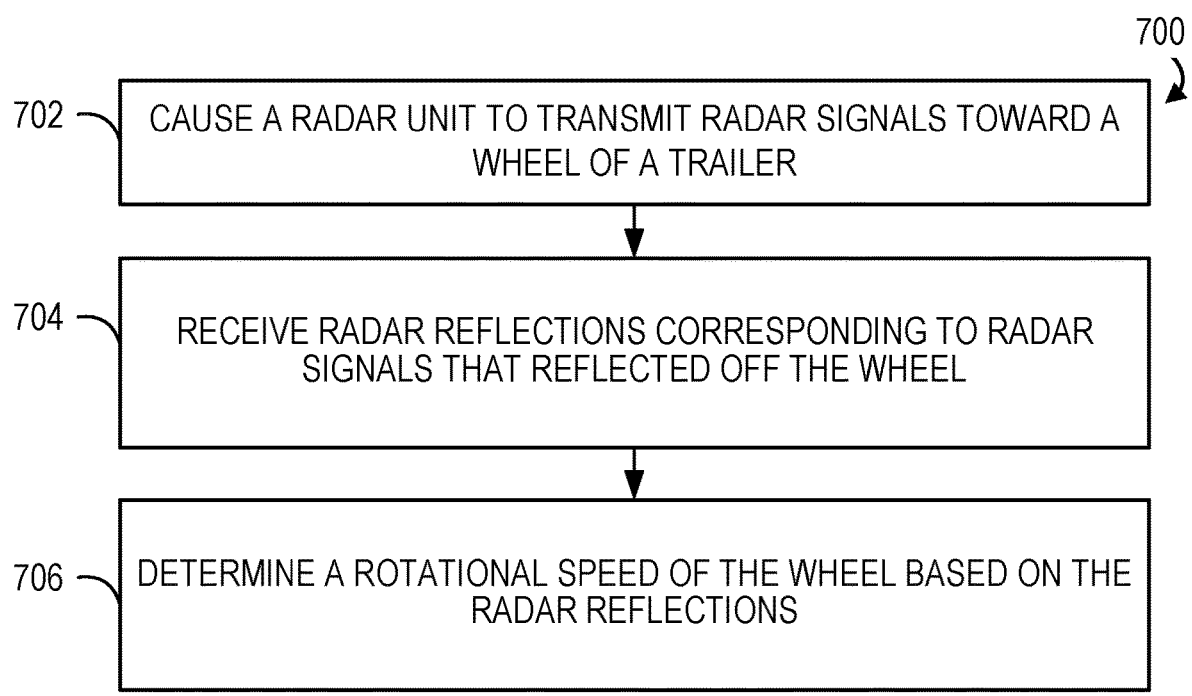
FIG. 7 is another flowchart of a method for measuring rotational speed of a trailer wheel using radar, according to one or more example embodiments.

FIG. 7 is a method for determining the rotational speed of a trailer wheel. Method 700 may include one or more operations, functions, or actions, as depicted by one or more of blocks 702, 704, and 706, each of which may be carried out by any of the systems shown in the other figures, among other possible systems.

At block 702, method 700 involves causing, by a computing device coupled to a vehicle, a radar unit to transmit radar signals toward a wheel of a trailer. The trailer is coupled to the vehicle and the radar unit has a field of view that includes the wheel.

In some examples, the vehicle is a semi-truck pulling a trailer. As such, the semi-truck may include one or more radar units positioned such that these radars units can transmit signals in the direction of one or more trailer wheels. The computing device may cause the radar unit to transmit radar signals as pulses toward the wheel.

At block 704, method 700 involves receiving radar reflections corresponding to radar signals that reflected off the wheel. The computing device may receive radar reflections corresponding to pulses that reflected off the wheel and determine a frequency spectrum based on the radar reflections. The computing device may identify a particular frequency based on the frequency spectrum. For instance, the computing device may identify the highest frequency or the lowest frequency using the frequency spectrum.

At block 706, method 700 involves determining a rotational speed of the wheel based on the radar reflections. In some examples, the computing device may determine the rotational speed of the wheel based on the particular frequency (e.g., highest or lowest frequency) and a radius of the wheel.

In some examples, method 700 may involve determining a largest observed frequency based on the radar reflections and determining the rotational speed of the wheel based on the largest observed frequency and a radius of the wheel.

Method 700 may further involve controlling the vehicle based on the rotational speed of the wheel. For instance, the computing device may determine that the rotational speed indicates that the trailer may require servicing (e.g., a flat tire).

In some examples, the computing device may cause the radar unit or a second radar unit toward a second wheel of the trailer. For instance, the computing device may cause a pair of radar units to simultaneously transmit radar signals toward different trailer wheels. The computing device may receive radar reflections that bounced off the second trailer wheel and use the radar reflections to determine a rotational speed for the second wheel. The computing device may compare the rotational speeds for the different tires and perform operations based on the comparison. For instance, the computing device may use the comparison to identify when a trailer wheel is not operating properly. The computing device may control the vehicle based on the comparison. In some instances, the computing device may provide instructions to a control system based on the comparison.

In some cases, the computing device may determine that a difference between the rotational speed of the wheel and the rotational speed of the second wheel exceeds a threshold (e.g., a threshold rotational speed difference). The computing device may provide instructions to the control system of the vehicle to gradually cause the vehicle to slowdown and stop. The pace of the gradual slowdown process may depend on the current speed and orientation of the vehicle as well as other factors. For instance, the slowdown may be longer in duration when the vehicle is navigating at high speed (e.g., on the highway) and shorter in duration when the vehicle is traveling at lower speeds (e.g., off the highway).

Figure 8:
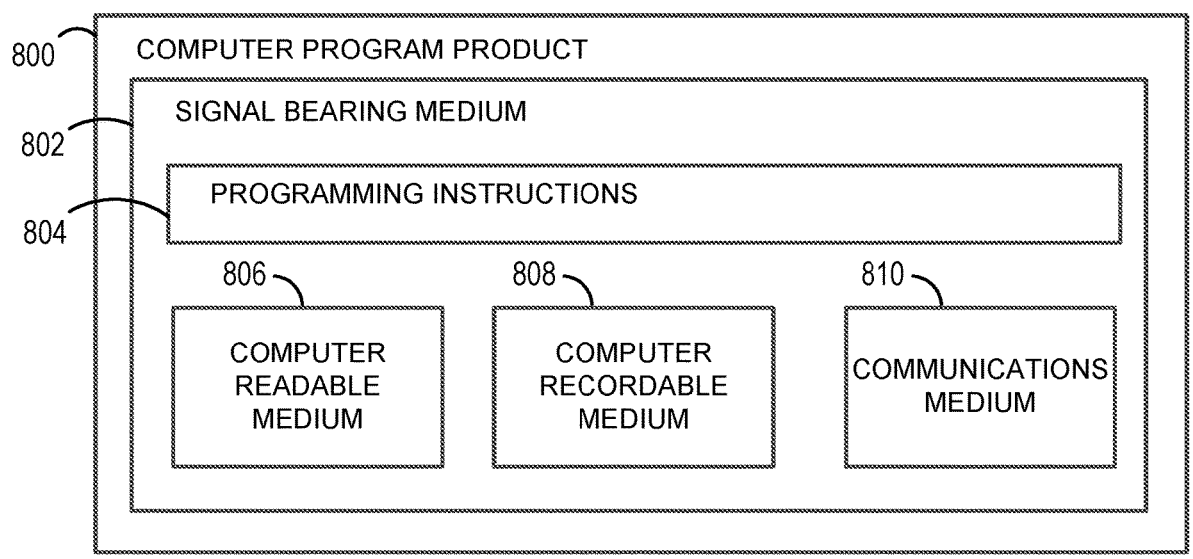
FIG. 8 illustrates a schematic diagram of a computer program, in accordance with example embodiments.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

Example computer program product 800 may be provided using signal bearing medium 802, which may include one or more programming instructions 804 that, when executed by one or more processors may provide functionality or portions of the functionality described above with respect to FIGS. 1-7. In some examples, the signal bearing medium 802 may encompass non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 112 of FIG. 1 may be configured to provide various operations, functions, or actions in response to the programming instructions 804 conveyed to the computer system 112 by one or more of the computer readable medium 806, the computer recordable medium 808, and/or the communications medium 810.

The non-transitory computer readable medium could also be distributed among multiple data storage elements, which could be remotely located from each other. The computing device that executes some or all of the stored instructions could be a vehicle, such as vehicle 200 illustrated in FIG. 2A-2D, among other possibilities. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A system comprising:
    a radar unit coupled to a vehicle, wherein the vehicle is towing a trailer, and wherein the radar unit has a field of view that includes a wheel of the trailer; and
    a computing device configured to:
       cause the radar unit to transmit radar signals toward the wheel of the trailer;
       receive radar reflections corresponding to radar signals that reflected off the wheel of the trailer; and
       based on the radar reflections, determine a rotational speed of the wheel of the trailer.

2. The system of claim 1, wherein the computing device is further configured to:
    cause the radar unit to transmit radar signals as pulses toward the wheel;
    identify a particular frequency from a frequency spectrum corresponding to the radar reflections; and
    based on the particular frequency and a radius of the wheel, determine the rotational speed of the wheel.

3. The system of claim 2, wherein the particular frequency corresponds to a highest frequency in the frequency spectrum.

4. The system of claim 2, wherein the particular frequency corresponds to a lowest frequency in the frequency spectrum.

5. The system of claim 1, wherein the computing device is further configured to: identify a largest observed frequency in the radar reflections; and
    determine the rotational speed of the wheel based on the largest observed frequency and a radius of the wheel.

6. The system of claim 1, wherein the computing device is further configured to:
    cause the vehicle to gradually stop based on the rotational speed of the wheel of the trailer.

7. The system of claim 1, wherein the computing device is further configured to:
    cause a second radar unit to transmit radar signals toward a second wheel of the trailer;
    receive radar reflections corresponding to radar signals that reflected off the second wheel; and
    based on the radar reflections corresponding to the radar signals that reflected off the second wheel, determine a rotational speed of the second wheel.

8. The system of claim 7, wherein the computing device is further configured to:

perform a comparison between the rotational speed of the wheel and the rotational speed of the second wheel; and based on the comparison, provide instructions to a control system of the vehicle.

9. The system of claim 8, wherein the computing device is further configured to:

determine that a difference between the rotational speed of the wheel and the rotational speed of the second wheel exceeds a threshold; and provide instructions to the control system of the vehicle to gradually cause the vehicle to slowdown and stop.

10. The system of claim 9, wherein the threshold depends on a steering angle and a speed of the vehicle.

11. The system of claim 1, wherein the computing device is further configured to:

control the vehicle based on the rotational speed of the wheel.

12. A method comprising:

causing, by a computing device coupled to a vehicle, a radar unit to transmit radar signals toward a wheel of a trailer, wherein the trailer is coupled to the vehicle, and wherein the radar unit has a field of view that includes the wheel of the trailer;

receiving radar reflections corresponding to radar signals that reflected off the wheel of the trailer; and based on the radar reflections, determining a rotational speed of the wheel of the trailer.

13. The method of claim 12, wherein causing the radar unit to transmit radar signals toward the wheel of the trailer comprises:

causing the radar unit to transmit pulses toward the wheel.

14. The method of claim 13, further comprising:

receiving radar reflections corresponding to pulses that reflected off the wheel;

determining a frequency spectrum based on the radar reflections;

identifying a particular frequency based on the frequency spectrum; and wherein determining the rotational speed of the wheel comprises:

determining the rotational speed of the wheel based on the particular frequency and a radius of the wheel.

15. The method of claim 14, wherein identifying the particular frequency based on the frequency spectrum comprises:

identifying a highest frequency in the frequency spectrum.

16. The method of claim 14, wherein identifying the particular frequency based on the frequency spectrum comprises:

identifying a lowest frequency in the frequency spectrum.

17. The method of claim 12, further comprising:

determining a largest observed frequency based on the radar reflections; and wherein determining the rotational speed of the wheel comprises:

determining the rotational speed of the wheel based on the largest observed frequency and a radius of the wheel.

18. The method of claim 12, further comprising:

controlling the vehicle based on the rotational speed of the wheel.

19. A non-transitory computer-readable medium configured to store instructions, that when executed by a computing system, causes the computing system to perform operations comprising:

causing a radar unit to transmit radar signals toward a wheel of a trailer, wherein the trailer is coupled to a vehicle, and wherein the radar unit has a field of view that includes the wheel of the trailer;

receiving radar reflections corresponding to radar signals that reflected off the wheel of the trailer; and based on the radar reflections, determining a rotational speed of the wheel of the trailer.

20. The non-transitory computer-readable medium of claim 19, further comprising:

determining a largest observed frequency based on the radar reflections; and wherein determining the rotational speed of the wheel comprises:

determining the rotational speed of the wheel based on the largest observed frequency and a radius of the wheel.

* * * * *